United States Patent

Livingood

[15] 3,690,183
[45] Sept. 12, 1972

[54] METHOD AND APPARATUS FOR TESTING FINE AGGREGATE SAMPLES

[72] Inventor: Harry Harlan Livingood, Overland Park, Kans.

[73] Assignee: Builders Sand Company, Kansas City, Kans.

[22] Filed: Oct. 15, 1970

[21] Appl. No.: 80,914

[52] U.S. Cl. .............................................. 73/432 PS
[51] Int. Cl. ............................................. G01n 15/02
[58] Field of Search .... 73/432 PS, 61, 61.4; 209/268, 209/270, 291

[56] References Cited

UNITED STATES PATENTS

| | | | |
|---|---|---|---|
| 2,264,223 | 11/1941 | Stancliffe | 73/432 PS |
| 1,236,256 | 8/1917 | Brace | 209/291 |
| 2,942,731 | 6/1960 | Soldini | 209/270 |

*Primary Examiner*—S. Clement Swisher
*Attorney*—Schmidt, Johnson, Hovey & Williams

[57] ABSTRACT

A method and apparatus for testing a fine aggregate sample wherein a measured quantity of the aggregate is introduced into the inner cylindrical sizing screen of a series thereof of decreasing mesh fineness and then liquid is introduced into the interior of the inner screen while the series thereof along with a casing around the screens are constantly rotated to effect segregation of the particles of aggregate. Manifold structure at one end of the screens directs particles retained within a particular screen into a respective perforated volumetric measuring cup with the liquid introduced serving not only to facilitate segregation of the particles but also operating to flush all particles retained by each screen from the surface thereof. Since the web volume of each segregated sample collected bears a mathematical relationship to the amount thereof in the original dry sample, the percentage of each size range of particles in the aggregate composition being sampled can be quickly and easily determined using an empirically derived table or slide rule.

8 Claims, 12 Drawing Figures

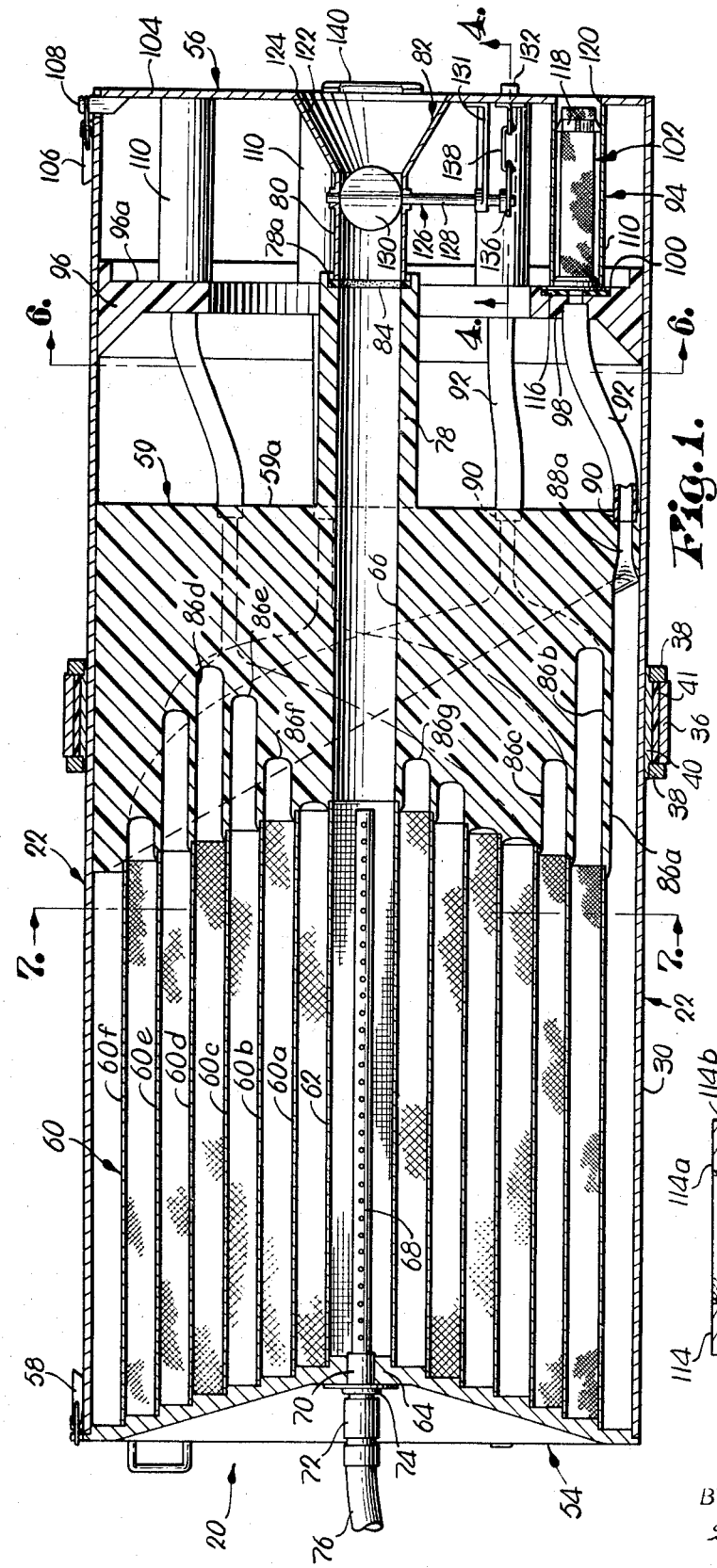

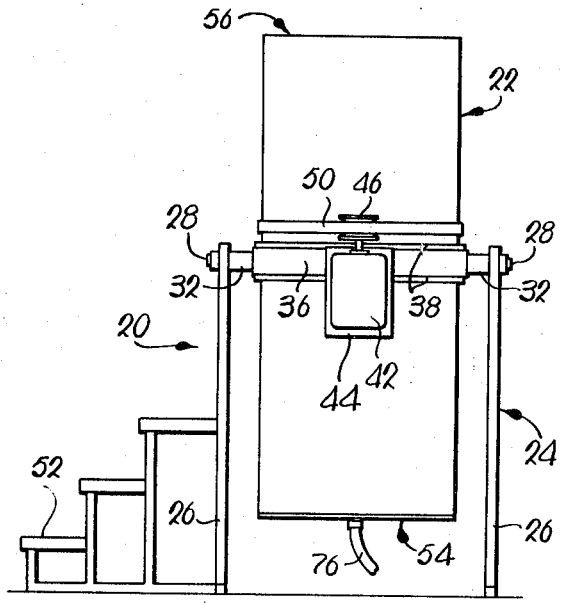
Fig. 10.
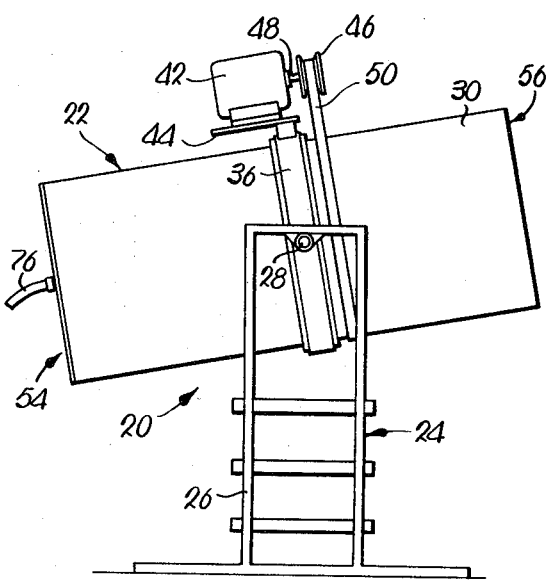
Fig. 11.
Fig. 5.
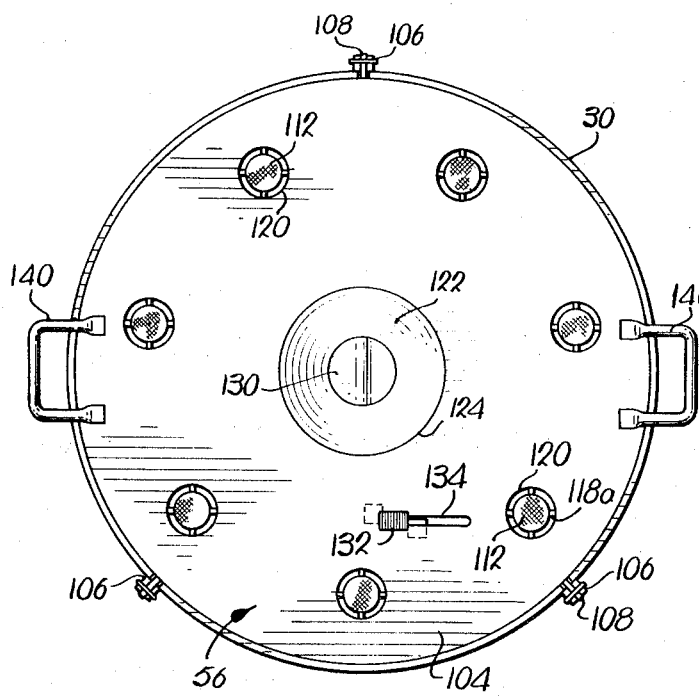
Fig. 12.
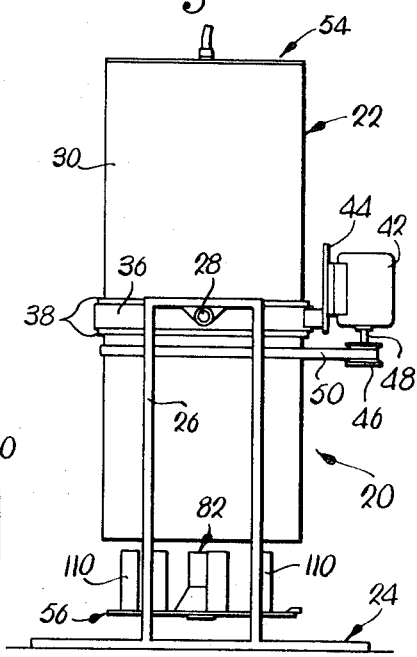
INVENTOR.
Harry Harlan Livingood
BY
Schmidt, Johnson, Hovey,
Williams & Chase
ATTORNEYS.

INVENTOR.
Harry Harlan Livingood
BY
ATTORNEYS.

METHOD AND APPARATUS FOR TESTING FINE AGGREGATE SAMPLES

This invention relates to improved procedures and apparatus for facilitating testing of fine aggregate samples and is particularly concerned with providing an efficient and rapid method and equipment for testing aggregates such as sand without the necessity of pre-drying the same so that the aggregate can be quickly classified regardless of the degree of wetness thereof.

It has long been known that the percentage distribution of different sizes of particles in a fine aggregate such as sand has an important bearing on the function of that aggregate when added to portland cement for example. In many instances, the specifications for a concrete mix set forth in detail the particle size distribution which must be present in the fine aggregate additive. Kaw River sand for example has long been known as a desirable aggregate for concrete since the normal distribution of particle sizes in the sand as taken from the river has been found to be very close to optimum. Even in the case of manufactured aggregates though, the particle size distribution must be closely controlled in order to permit effective standardization of the concrete mixes. Thus, an aggregate supply company must have the capability of testing its product not only to confirm that is does meet particular specifications, but also for the purpose of blending various compositions as necessary to meet a particular specification. Desirably, such testing capability must not only be reliable but be capable of being performed in a minimum of time since it is frequently necessary to test the product substantially at the time it leaves the processing plant, or in response to an inquiry by a concrete mixer who needs to change his formulation while mixing, or requires aggregate on a relatively continuous basis from the supplier by virtue of the substantially uninterrupted operation of the mix plant.

Heretofore, testing of fine aggregate compositions such as sand has been carried out using standard procedures wherein a sample of predetermined volume was subjected to a drying operation and then placed on the uppermost of a series of screens having mesh of increasing fineness as the bottom of the stack of screens was approached, so that aggregate particles of differing sizes were retained on respective screens of such mesh fineness that it was impossible for the particles to pass therethrough. The series of cylindrical screens were normally vibrated while in vertically stacked relationship to somewhat expedite the classification of the sand. After completion of the segregation of particles by size, the individual screens were weighed to determine the weight of particles retained thereon, since the weight of the screen may be subtracted from the total weight of the screen unit with the aggregate thereon. Generally, this test procedure took forty-five minutes to an hour to complete, primarily because of the time required to completely dry the aggregate composition. It is to be recalled in this respect that riverbed derived aggregate pumped from the bed of a river is inherently wet and even when the sand is permitted to stand for some time before being shipped, it still contains a substantial amount of water because of normal ambient weather conditions.

It is therefore the primary object of the present invention to provide a rapid and accurate method and apparatus for testing fine aggregates such as sand which may be carried out in a fraction of the time heretofore required by virtue of the fact that it is not necessary to dry the aggregate prior to testing thereof.

It is another important object of the invention to provide fine aggregate testing apparatus and a method of testing aggregate compositions wherein the particles are sized on a series of screens of increasing fineness utilizing water to not only facilitate agitation of the particulate composition as it is caused to pass through the screens, but also to flush particles retained on a particular screen into corresponding collection receptacles associated therewith, so that the volume of aggregate particles retained on a particular screen may be quickly and accurately determined. Thus, the relative ratios of particles of different sizes in the sample of aggregate being tested may be readily determined utilizing empirically derived tables or a slide rule based thereon.

A particularly important object of the invention is to provide improved apparatus for facilitating the testing of sand without the necessity of pre-drying the fine aggregate wherein a series of cylindrical screens of increasing mesh fineness are located in coaxial, spaced, telescoped relationship so that by introducing the sample into the central screen having the coarsest mesh, followed by delivery of water thereto, the aggregate is caused to pass from one cylindrical screen to the next depending upon the particle size, with segregation of the particles being effected as they are retained on a screen having a mesh of such fineness that the particles cannot pass therethrough. In this manner, classification of the aggregate may be effectively accomplished in a minimum of time, particularly in view of the fact that the screens are preferably rotated during segregation of the particle sizes so that finer particles are directed toward the perimeter of the cylindrical assembly by centrifugal force.

In this connection, it is a further important object of the invention to provide aggregate testing apparatus as described above, wherein unique manifold structure within the casing of the apparatus is operably associated with the sizing screens so as to cause aggregate flushed from the surfaces of respective screens by water directed into the interior of the assembly, to flush the particles of aggregate into respective collection receptacles therefor removably carried by the separation structure at one end thereof. The quantity of particles of different size ranges thus may be readily determined by observing the volume of aggregate collected in each receptacle.

A still further important object of the invention is to provide particle segregation apparatus comprising a self-contained unit which not only includes a tubular element for receiving the sample that automatically measures the volume thereof and assures introduction of the same amount of aggregate into the equipment during each cycle of operation thereof, but also serves as a support for the collection receptacles to thereby minimize the overall size of the structure and permit fabrication thereof at a minimum cost.

Another important object of the invention is to provide aggregate testing apparatus as described wherein the cylindrical structure housing the sizing screens, the particle guiding manifold, and the collection receptacles coupled to the manifold for receipt of particles from the separation screens via the manifold, is mounted for rotation about the longitudinal axis of the body as well as swinging movement about an axis transverse of the longitudinal axis of the cylindrical structure so that the assembly may be located in one upright position for loading, then tilted and rotated to effect segregation of particles, and finally turned upright in the opposite direction, for ready unloading of the collection receptacles.

A further important object of the invention is to provide an improved process and apparatus permitting wet sieving of a fine aggregate such as sand wherein the same size screens as used in conventional A.S.T.M. dry weight testing standards and with accuracy sufficiently close to the conventional A.S.T.M. test to not only allow use of the wet volume procedure on a day-by-day quality control basis, but also of such nature that relatively unskilled personnel may be assigned the task of conducting the sampling test on a routine basis.

Also an important object of the invention is to provide fine aggregate testing apparatus as described wherein the screen sizes may be varied at will depending upon the particle size segregation required for a particular specification with change in screens being the only alteration of the testing equipment required for test variation.

Other important objects and details of the present improved process and apparatus will become apparent or be explained as the specification progresses.

In the drawings:

FIG. 1 is a cross-sectional view through the test cylinder of the present invention illustrating the classification screens, the guide manifold structure operably associated therewith, sand measuring and control components for delivering a predetermined amount of the fine aggregate to be tested to the sizing screens, and the receptacles for receiving respective segregated particles of sand to permit rapid measurement of the volume thereof;

FIG. 2 is a side elevational view of the end support plate structure of the test equipment illustrated in FIG. 1, and showing the support plate removed from the main casing with parts thereof in section to better illustrate details of construction of the apparatus and also showing the way in which the volume of particles collected in a respective receptacle may be readily determined utilizing an indicator rod having volume index markings along the longitudinal length thereof;

FIG. 3 is an enlarged vertical, cross-sectional view through one of the collection receptacles adapted to be removably received in a carrier therefor on the support plate of the test cylinder;

FIG. 4 is a fragmentary, cross-sectional view taken on the line 4—4 of FIG. 1 and illustrating the manually operable mechanism for controlling functioning of the gate structure forming a part of the sample delivery mechanism carried by the removable support plate at the right-hand end of the test assembly as illustrated in FIG. 1;

FIG. 5 is an end elevational view of the right-hand end of the test cylinder as shown in FIG. 1 and illustrating the relative positions of the receptacle receiving carriers mounted on the main plate of the support;

Figure 9:
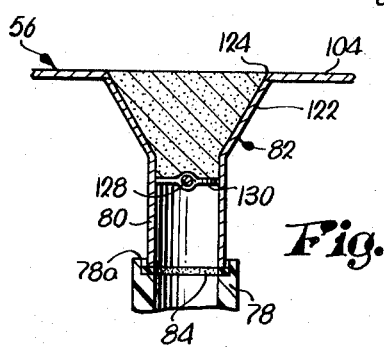
Figure 8:
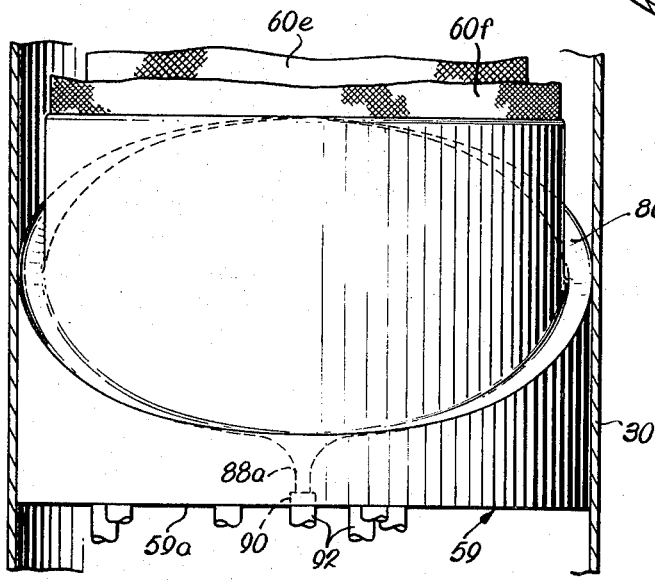
FIG. 8 is a fragmentary, partially sectional view illustrating the manifold structure in the central part of the test assembly as shown in FIG. 1, and showing the curvature of the outer guide wall of the manifold serving to direct particles flushed from the space between the test casing and the outermost screen, toward the collection receptacle therefor.

FIG. 9 is a fragmentary cross-sectional, somewhat schematic showing of the sample measuring and delivering components of the support plate at the right-hand end of the test assembly as illustrated in FIG. 1, and showing the way in which a measured amount of fine aggregates such as sand may be directed into the testing screen area of the equipment upon opening of the control valve normally closing the passage leading to the innermost cylindrical screen;

FIG. 10 is a somewhat schematic, elevational view of the test apparatus of the present invention showing the test cylinder mounted in an upright position for loading of fine aggregate to be tested;

FIG. 11 is also an essentially schematic, elevational view of the apparatus shown in FIG. 10, and in this case showing the test cylinder in the normal disposition thereof for sand classification; and FIG. 12 is a view similar to those of FIGS. 10 and 11, but in this instance illustrating the test cylinder in the position thereof for unloading which is 180° from the cylinder position of FIG. 10.

Fine aggregate testing apparatus particularly useful in carrying out the novel testing process of this invention is illustrated in essentially schematic form in FIGS. 10–12 inclusive of the drawings, and includes as major component parts, cylindrical separation structure 22 mounted for swinging movement on a support 24 which for purposes of illustration only is shown as a pair of upright, horizontally spaced, parallel frame members 26. Opposed stub shafts 28 carried by suitable bushings at the upper ends of frame members 26 support the cylindrical, imperforate casing 30 of structure 22 by virtue of tubular sleeves 32 which are welded to collar 36 disposed in circumscribing relationship to casing 30. As best illustrated in FIG. 1, collar 36 is trapped between two rings 38 secured to a band 40 connected directly to the outer surface of casing 30. An antifriction element 41 interposed between band 40 and collar 36 facilitates rotation of casing 30 with respect to band 40 during operation of drive motor 42. Bracket 44 secured to collar 36 and swingable therewith about the aligned axes of stub shafts 28 mounts drive motor 42 in disposition such that the pulley 46 on the drive shaft 48 can drive belt 50 extending around the periphery of casing 30 in frictional engagement therewith.

The load position of separation structure 22 is illustrated in FIG. 10 wherein the sample to be tested is introduced at the top of the casing 30, and to this end, a series of steps 52 may be provided adjacent one of the frame members 26 to permit the test operator to readily place fine aggregate to be tested in the receiver therefor and also control the operation of structure 22.

The sorting position of cylindrical separation structure 22 is illustrated in FIG. 11, while the unloading position is indicated in FIG. 12 with the structure 22 being rotated 180° with respect to the disposition thereof in FIG. 10 for loading purposes.

Casing 30 is normally closed at opposed ends thereof by end plate units 54 and 56 respectively.

Viewing FIG. 1, the left-hand end plate unit is removably held in place on casing 30 by a series of manually operable, quick release toggle fasteners 58 carried by the end extremity of casing 30 and engageable with suitable hooks therefor on end plate unit 54.

Joined to casing 30 within the interior thereof intermediate the ends of such casing and thereby in spaced relationship from end plate unit 54 is a molded particle guide collector 59 cooperable with end plate unit 54 to trap a series of cylindrical sizing screens 60 which for purposes of illustration are shown as screens 60a–60f inclusive. A perforated inner tube 62 joining centrally located boss 64 of end plate 54 with the central passage 66 through collector 59 serves to receive the sample to be tested upon introduction of the same into the interior of casing 30 through end plate unit 56.

The opposed, innerfaces of end plate unit 54 and collector 59 are stepped as illustrated in FIG. 1 to present a series of circular bosses and openings respectively for receiving and supporting the cylindrical sizing screens 60a–60. Although the screens can be of any mesh size desired, it is preferable that they be the same as A.S.T.M. standard sieves in order to permit correlation of the respective proportions of particle sizes segregated with standard test procedures now in use. Thus, preferably the screens 60 are of increasing fineness as casing 30 is approached with the screen 60a having a one-fourth inch mesh screen size while screens 60b–60f are in order 8 mesh, 18 mesh, 30 mesh, 50 mesh and 100 mesh.

An elongated water distribution pipe 68 extending substantially the length of tube 62 in coaxial spaced relationship thereto is carried by collar 70 extending through boss 64 of end plate unit 54. Quick disconnect coupling 72 releasably joined to the swivel fitting 74 on collar 70 is coupled to a water hose 76 leading to a source of water under pressure, which for example may be a normal city water supply.

The face 59a of collector 59 remote from screens 60 is in spaced relationship from end plate unit 56 and is interrupted only by a centrally located, integral, tubular extension 78 having a circular recess 78a in the outermost extremity thereof disposed to receive the end 80 of a funnel shaped combination measuring and delivery tube 82 carried by end plate structure 56. Annular gasket 84 in recess 78a seals the end of tube 82 when end plate unit 56 is in the normal end closing disposition of the same as illustrated in FIG. 1.

The guide collector 59 has a series of inclined guide walls integrally formed in the surface thereof facing screens 60 with each inclined guide surface leading to a respective passage through the body of collector 59 and aligned with the space between adjacent screens 60 or the outer screen 60f and casing 30. Thus, the outermost guide surface 86a presents a wall surface inclined transversely of the longitudinal axis of casing 30 and aligned with the space between the innerface of the latter and the outer surface of sizing screen 60f.

Figure 7:
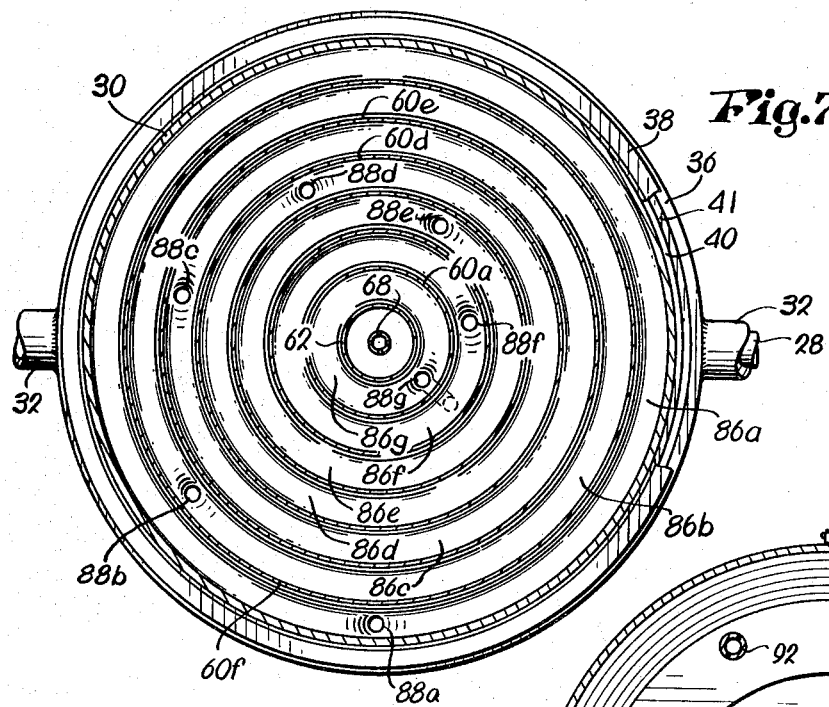
FIG. 7 is also a cross-sectional view through FIG. 1 on the line 7—7 and looking toward the particle diversion manifold structure leading from the classification screens to the sample collection receptacles carried by the support plate structure at the right-hand end of the test assembly.

Inclined guide surface 86a leads into a passage 88a in the collector body and positioned at the point at which the surface 86a is in greatest spaced relationship from sizing screen 60f. The other guide surfaces 86b–86g inclusive in collector body 59 also lead to passages 88b–88 respectively aligned with the spaces between adjacent sizing screens 60 and as shown in FIG. 7, openings 88a–88g respectively are in a generally serpentine pattern with respect to the axis of casing 30. Since the angle of inclination of guide surfaces 86a–86g inclusive is preferably approximately equal in all instances, although the surfaces lie in planes which are in angular relationship relatively, it can be seen from FIG. 1 that surface 86a is of considerably greater depth in the body of collector 59 than the innermose guide surface 86g.

The face 59a of collector 59 is provided with a series of recesses 90 therein aligned with each of the passages 88a–88 inclusive for receiving one end of a corresponding transfer tube 92 leading from passages 88a–88 inclusive to collection receptacle structure broadly designated 94 and forming part of the end pate unit 56.

Means for supporting the ends of tubes 92 remote from collector 59 includes an annular support element 96 provided with recesses 98 therein for telescopically receiving a corresponding end of a respective transfer tube 92 as best shown in FIG. 1. The opposed annular face 96a of element 96 has circular depressions 100 therein which receive the ends of respective collection receptacles 102 of receptacle structure 94 and which are detailed in FIGS. 2 and 3.

As indicated in FIGS. 1 and 2, unit 56 includes a circular plate 104 releasably held on the right-hand end of casing 30 as shown in FIG. 1, by a series of manually operable, quick release toggle fasteners 106 releasably engageable with the hooks 108 on the underface of plate 104. A plurality of tubular carriers 110 affixed to the innerface of plate 104 and directly aligned with respective depressions 100 in support element 96 serve as means for receiving respective receptacles 102 and hold the same in place in depressions 100 as well as upon removal of unit 56 from casing 30 as indicated in FIG. 2 of the drawings.

Each of the receptacles 102 comprises a cylindrical, cup-shaped wire mesh element 112 having a flange member 114 affixed to the open end thereof and of a diameter to be received within a corresponding depression 100 in support element 96. The outwardly facing flat face 114a of flange member 114 is adapted to be seated against an annular gasket 116 carried in each of the depressions 100 as best shown in FIG. 1. The lip portion 114b of each flange member 114 is of greater diameter than a corresponding tubular carrier 110 as apparent in FIG. 2, so that when the apparatus 20 is assembled, the carriers 110 press against corresponding lip portions 114b of flange members 114 to hold receptacles 102 in coaxial relationship with respect to carriers 110. A support device 118 carried by each of the receptacles 102 adjacent the end thereof remote from a corresponding flange member 114 has outwardly projecting extensions 118a thereon for supporting the closed ends of receptacles 102 throughout the test procedure. The screen material from which receptacles 102 are constructed is preferably of somewhat finer mesh than the finest mesh of screens 60 so that all particulate matter directed into receptacles 102 is retained therein while permitting water to flow therethrough for discharge from apparatus 20 through the respective openings 120 in plate 104 aligned with corresponding carriers 110.

The funnel shaped tube 82 having an outwardly diverging end 122 affixed to the normally innermost face of plate 104 in alignment with the opening 124 in plate unit 56 permits a measured amount of fine aggregate to be delivered to the interior of tube 62 under the control of gate mechanism 126. The shaft 128 of mechanism 126 extending through end 80 of tube 82 carries a circular butterfly valve 130 of a size to close cylindrical end 80 and prevent flow of particulate material thereby as indicated in FIG. 9 when valve 130 is in spanning relationship to tube 82. Bracket 131 secured to plate 104 supports the end of shaft 128 remote from tube 82. The manually manipulable button 132 slidably carried by plate 56 and movable along a path of travel limited by slot 134 (FIG. 5) is operably connected to a crank arm 136 on shaft 128 by link 138.

Figure 6:
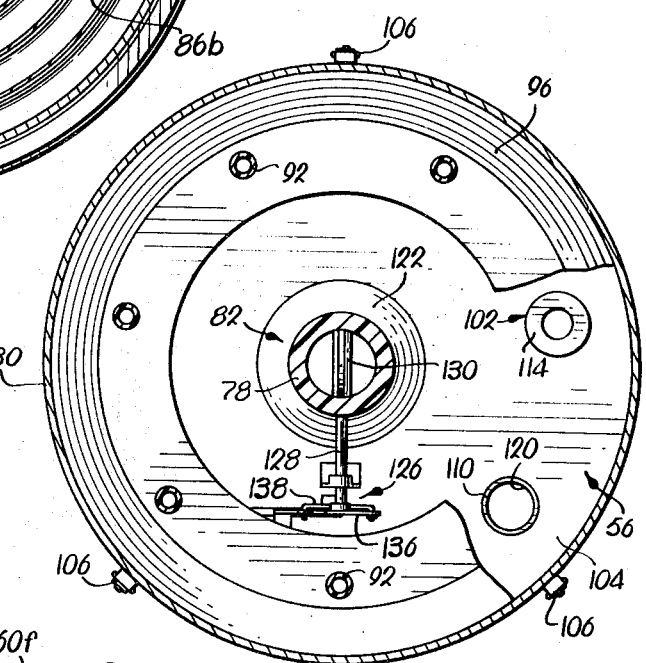
FIG. 6 is a cross-sectional view taken on the line 6—6 of FIG. 1 and looking to the right as indicated by the arrows.

Outwardly projecting handles 140 secured to opposite sides of plate 104 of unit 56 facilitate handling of the latter when testing apparatus 20 is in the unload position thereof as illustrated in FIG. 12. As is apparent from FIG. 6, the fasteners 106 are not spaced equally around the perimeter of end plate unit 56 and consequently the latter must always be secured to casing 30 in the same relative relationship thereto so that the test operator will always know precisely which receptacles 102 are receiving aggregate from corresponding spaces between screens 60.

In operation, and assuming that screens 60 of the mesh sizes defined above are positioned within casing 30 in coaxial, spaced, telescoped relationship as illustrated in FIG. 1, and that the end plate units 54 and 56 are secured to opposite ends of the cylindrical casing. The separation structure 22 is rotated into the disposition thereof illustrated in FIG. 10 whereupon button 132 is pushed in a direction to close butterfly valve 130. The conical cavity defined by end 122 of tube 82 is then filled with the fine aggregate sample to be tested to a level exactly even with the top of plate 104. In this manner, a reproducible amount of material may be tested each time without the necessity of measuring such sample. Button 132 is pushed in a direction to open butterfly valve 130 whereby the particulate material may gravitate directly downwardly into the interior of tube 62 via passage 66 in collector 59. Water ejected from hose 76 is used to wash residual sand adhering to the walls of conical cavity 122 and passage to assure that all of the sample is directed into tube 62. Separation structure 22 is then pivoted about the axes of stub shafts 28 into horizontal or slightly inclined disposition as illustrated in FIG. 11 and hose 76 connected to coupling 72 causing a spray to be ejected radially from the orifices in pipe 68. Motor 42 is energized to rotate casing 30 about its longitudinal axis through the belt drive provided by engagement of belt 50 with the outer surface of the structure 22. This rotation is continued, along with introduction of water into the interior of casing 30 until such time as complete segregation of the fine aggregate has been effected. Normally this will take no more than about 4 to 6 minutes at the most. During rotation of separation structure 22, particles which are of such fineness that they will pass through the screen mesh of a respective screen 60 continue toward the periphery of separation structure 22, until such time as the particles cannot pass through a screen and are retained on the surface thereof. The water injected into structure 22 and moving outwardly therefrom by virtue of the combined action of gravity and centrifugal force, not only agitates the fine aggregate being screened to assure rapid classification thereof but also serves to flush the particles retained on respective screens 60 toward the receptacles 102 via guide surfaces 86 and tubes 92, as excess water runs out of the right-hand end of the apparatus.

At the conclusion of the test cycle, the structure 22 is rotated into the disposition illustrated in FIG. 12 which is exactly the opposite of the load position of FIG. 10, and the rotation of casing 30 is continued for a short interval of time to assure that all of the particles retained between respective screens 60 or between screen 60f and the casing wall 30 are flushed down into receptacles 102 for retention therein. Excess water is discharged from cylindrical separation structure 22 through the openings 120 in plate 104 of plate unit 56.

After cessation of rotation of structure 22 and discontinuance of introduction of water thereinto, the test operator releases toggle fasteners 106 to lower plate unit 56 onto the floor beneath casing 30 so that the volume of aggregate contained in each receptacle 102 may be quickly and rapidly determined.

As is most apparent from FIG. 2, the volume of fine aggregate contained in each receptacle 102 can best be determined by using a measuring stick 140 having indicia 140a thereon indicating the depth to which the stick goes before reaching the aggregate. Preferably, stick 140 has a disc segment on the end thereof permitting the test operator to tamp the material slightly to assure that the surface thereof is flat for measurement purposes.

The volume of wet aggregate contained in respective receptacles 102 may be used to determine the equivalent dry weight of segregated aggregate using empirical procedures wherein wet volumes are compared against dry samples tested in accordance with standard A.S.T.M. procedures as previously described, so that a table or slide rule may be prepared for subsequent use of apparatus 20.

It is to be understood that although the preferred apparatus has been shown for carrying out the test procedure of the present invention, other equivalent devices may be used with equal result so long as the wet volumes obtained are mathematically correlated with corresponding dry proportions of sized aggregate.

Having thus described the invention, what is claimed as new and desired to be secured by Letters Patent is:

1. Apparatus for testing a fine aggregate composition containing particles of different sizes comprising:
   separation structure adapted to receive a measured quantity of said composition as a sample thereof and including a series of generally cylindrical screen units in spaced, telescoped relationship having screen portions of different relative screen mesh sizes respectively, the unit having the coarsest mesh screen portion being located in the innermost position relative to the remaining screen units, said screen units being disposed for receipt of the sample on said unit having the coarsest screen mesh portion and being arranged in serial order of increasing fineness of screen mesh so that the particles of said sample are segregated as to size since all but those particles retained by the screen portion of a respective screen unit pass therethrough to the next adjacent screen unit;

a casing located in surrounding relationship to the outermost screen unit of said series thereof;

means for directing a liquid against the particle retaining portion of each screen unit to flush particles therefrom that have been retained thereon;

volumetric measuring means including a receptacle for the casing and each screen unit having a screen mesh portion of a different size than other screen units, said volumetric collecting means collecting the particles flushed from each screen unit respectively for permitting rapid determination of the corresponding volumes thereof with respect to the initial volume of said measured quantity of said aggregate composition, each of said receptacles containing openings therein located to prevent accumulation of liquid in a respective receptacle; and manifold means operably associated with said screen units and the casing for directing particles flushed from respective screen units and the casing into corresponding volumetric measuring means, said manifold means being provided with guide surfaces leading from the spaces between respective adjacent pairs of screen units as well as the space between the outermost screen unit and the casing, directly to corresponding receptacles.

2. Apparatus as set forth in claim 1, wherein is provided a support plate removably carried by said casing remote from the screen units, said manifold means being located between the screen units and said support plate, there being a series of carriers on said support plate for removably receiving respective receptacles and disposed to support the receptacles in locations to receive aggregate particles delivered thereto from said screen units via the manifold means.

3. Apparatus as set forth in claim 2, wherein said receptacles are each constructed of screen material for free flow of liquid therethrough while retaining particles of aggregate delivered therein.

4. Apparatus as set forth in claim 2, wherein said support plate is provided with a tubular delivery element for receiving said quantity of aggregate, said manifold means having a passage therethrough located to communicate the tubular delivery element with the interior of the innermost screen element.

5. Apparatus as set forth in claim 4, wherein is provided gate means in said tubular element for controlling a release of said quantity of aggregate therefrom.

6. Apparatus as set forth in claim 5, wherein said tubular element is of a size to contain said predetermined quantity of aggregate when the gate means is in disposition preventing delivery of said aggregate to the innermost screen unit from said tubular element.

7. Apparatus for testing a fine aggregate composition containing particles of different sizes comprising:

separation structure adapted to receive a measured quantity of said composition as a sample thereof and including a series of generally cylindrical screen units in spaced, telescoped relationship having screen portions of different relative screen mesh sizes respectively, the unit having the coarsest mesh screen portion being located in the innermost position relative to the remaining screen units, said screen units being disposed for receipt of the sample on said unit having the coarsest screen mesh portion and being arranged in serial order of increasing fineness of screen mesh so that the particles of said sample are segregated as to size since all but those particles retained by the screen portion of a respective screen unit pass therethrough to the next adjacent screen unit;

a casing located in surrounding relationship to the outermost screen unit of said series thereof;

means mounting said casing for swinging movement about an axis transverse to the longitudinal axis thereof to facilitate loading and unloading of the structure;

means for directing a liquid against the particle retaining portion of each screen unit to flush particles therefrom that have been retained thereon;

volumetric measuring means for collecting the particles flushed from each screen unit respectively for permitting rapid determination of the corresponding volumes thereof with respect to the initial volume of said measured quantity of said aggregate composition, each of said receptacles containing openings therein located to prevent accumulation of liquid in a respective receptacle; and manifold means operably associated with said screen units and the casing for directing particles flushed from respective screen units and the casing into corresponding volumetric measuring means.

8. Apparatus for testing a fine aggregate composition containing particles of different sizes comprising:

separation structure adapted to receive a measured quantity of said composition as a sample thereof and including a series of generally cylindrical screen units in spaced, telescoped relationship having screen portions of different relative screen mesh sizes respectively, the unit having the coarsest mesh screen portion being located in the innermost position relative to the remaining screen units, said screen units being disposed for receipt of the sample on said unit having the coarsest screen mesh portion and being arranged in serial order of increasing fineness of screen mesh so that the particles of said sample are segregated as to size since all but those particles retained by the screen portion of a respective screen unit pass therethrough to the next adjacent screen unit;

a casing located in surrounding relationship to the outermost screen unit of said series thereof;

means mounting said casing for rotation about the longitudinal axis thereof to facilitate segregation of particles by said screen units and for swinging movement about an axis transverse to said longitudinal axis to facilitate loading and unloading of the structure;

means for directing a liquid against the particle retaining portion of each screen unit to flush particles therefrom that have been retained thereon;

volumetric measuring means for collecting the particles flushed from each screen unit respectively for permitting rapid determination of the corresponding volumes thereof with respect to the initial volume of said measured quantity of said aggregate composition, each of said receptacles containing openings therein located to prevent accumulation of liquid in a respective receptacle; and manifold means operably associated with said screen units and the casing for directing particles flushed from respective screen units and the casing into corresponding volumetric measuring means.

* * * * *